United States Patent [19]

Luke et al.

[11] Patent Number: 5,199,838
[45] Date of Patent: Apr. 6, 1993

[54] NUT FOR USE ON ROADWAYS, RUNWAYS, IN REINFORCED CONCRETE CONSTRUCTION, AND THE LIKE

[76] Inventors: David E. Luke, 1009 Delaware Ave., Ft. Pierce, Fla. 34950; Richard MacAllaster, Box 1121, Marathon, Fla. 33050

[21] Appl. No.: 810,306

[22] Filed: Dec. 19, 1991

[51] Int. Cl.[5] .................. F16B 37/00; F16B 39/28
[52] U.S. Cl. .................... 411/140; 411/186; 411/427; 411/910
[58] Field of Search .............. 411/140, 186–189, 411/379, 380, 405, 537, 917, 910, 427, 432

[56] References Cited

U.S. PATENT DOCUMENTS

| | | |
|---|---|---|
| 149,362 | 4/1874 | Watrous ............... 411/140 |
| 367,196 | 7/1887 | Deblieux ............... 411/186 |
| 386,739 | 7/1888 | Connelly . |
| 576,036 | 1/1897 | Cour ................... 411/379 |
| 800,189 | 9/1905 | Ward . |
| 1,231,840 | 7/1917 | Bolt ................... 411/140 |
| 1,865,346 | 6/1932 | Wells . |
| 1,882,462 | 10/1932 | Weber . |
| 1,937,109 | 11/1933 | Colt . |
| 2,284,824 | 6/1942 | Hungerford . |
| 2,556,672 | 6/1951 | Bergh et al. . |
| 2,591,631 | 4/1952 | Stanitski . |
| 2,917,331 | 12/1959 | Baer et al. . |
| 3,796,123 | 3/1974 | Duffy et al. . |
| 3,821,975 | 7/1974 | Haker . |
| 4,253,509 | 3/1981 | Collet ............... 411/910 X |
| 4,269,248 | 5/1981 | Madean et al. . |
| 4,302,137 | 11/1981 | Hart . |

FOREIGN PATENT DOCUMENTS 2338628  8/1977  France ................... 411/405

Primary Examiner—Neill R. Wilson
Attorney, Agent, or Firm—Jerry T. Kearns

[57] ABSTRACT

A nut for use on roadways, runways, in reinforced concrete construction, and the like, possesses a generally circular shape, with spherical top and bottom surfaces connected by a cylindrical side wall. A central aperture formed through the nut is threaded for engagement with an anchor bolt secured in a roadway surface by a conventional epoxy. Four smaller diameter threaded apertures are disposed on a common circle adjacent a peripheral edge of the nut, evenly spaced at ninety degree angular increments. The smaller diameter apertures are utilized in conjunction with a spanner wrench to tighten the nut on an anchor bolt. After the nut is tightened securely into position, an externally threaded drill guide bushing is engaged within each of the four smaller diameter apertures and utilized to drill a coaxial cylindrical bore in the roadway surface. After the drill guide bushings are removed, stepped diameter securing screws are tightened into each of the four smaller diameter apertures to prevent the nut from backing off installation. The spherical top and bottom surfaces of the nut allow sufficient flexure to accommodate shock and expansion and contraction induced by temperature variations. The nut is designed for roadway applications such as the installation of expansion joints; the spherical upper surface of the nut reduces damage and shock to vehicle tires and vehicle occupants.

20 Claims, 3 Drawing Sheets

NUT FOR USE ON ROADWAYS, RUNWAYS, IN REINFORCED CONCRETE CONSTRUCTION, AND THE LIKE

BACKGROUND OF THE INVENTION

1. Field of the Invention

The present invention relates to nuts for use in securing various elements to cooperating bolts or screws, and more particularly pertains to a new and improved nut for use on roadways adapted to minimize damage to vehicle tires and shocks to vehicle suspensions, as well as providing an increased service life.

2. Description of the Prior Art

Various types of nuts are known in the prior art. A typical example of such a nut is to be found in U.S. Pat. No. 800,189, which issued to D. Ward on Sep. 26, 1905. This patent discloses a generally rectangular nut with a concave curvature, formed from a spring metal plate and having a substantially rectangular central aperture with four partially screw threaded sides to present eight locking corners. U.S. Pat. No. 1,865,346, which issued to W. Wells on Jun. 28, 1932, discloses a generally triangular nut having a central threaded aperture and a semi-cylindrical recess formed at each apex. The apex recesses are adapted to engage jaws of a complementary wrench for purposes of tightening the nut. Additionally, this patent discloses that the apex recesses may be employed to receive therethrough a pin screw or other similar fastener anchored in a stationary structure which will lock the nut against retrograde movement. U.S. Pat. No. 1,882,462, which issued to S. Weber on Oct. 11, 1932, discloses a spanner wrench having a plurality of pin-type adjustable jaws for engagement with apertures, notches or recesses in a nut for purposes of driving the same. U.S. Pat. No. 1,937,109, which issued to S. Colt on Nov. 28, 1933, discloses a nut structure for retaining a concrete pouring form which employs a central circular aperture for engagement with a threaded stud and peripheral apertures for engagement with securing nails or pins. U.S. Pat. No. 2,284,824, which issued to D. Hungerford on Jun. 2, 1942, discloses an anchor nut having a central threaded circular aperture and radially outer, diametrically opposed, reduced diameter smooth bore apertures. U.S. Pat. No. 2,556,672, which issued to R. Bergh et al on Jun. 12, 1951, discloses a nut having a central threaded aperture surrounded by a radial flange through which reduced diameter bores are positioned. The reduced diameter bores are adapted for use with locking wires to prevent backing off of the nut. U.S. Pat. No. 2,591,631, which issued to W. Stanitski on Apr. 1, 1952, discloses a nut for use in securing a vehicle wheel including a central threaded aperture surrounded by a plurality of evenly spaced radially outer smaller diameter apertures adapted to receive locking wires for preventing backing off of the nut after installation. U.S. Pat. No. 3,796,123, which issued to W. Duffy et al on Mar. 12, 1974, discloses a sheet metal nut having an inner threaded barrel portion connected to an outer, hexagonally shaped barrel portion by a connecting web adjacent one end and including a hexagonally-shaped depression formed in the inner barrel portion over a limited axial extent. The internal phases of the hexagonal depression are disposed opposite to and match the hex wrenching faces on the outer barrel portion and are effective to transmit torque to the inner barrel portion when the nut is turned onto a mating bolt thereby reducing torsional strain on the connecting web incident to tightening of the nut. U.S. Pat. No. 3,821,975, which issued to L. Haker on Jul. 2, 1974, discloses an automotive wheel nut having a frustoconical periphery and an outer face including a pair of wrench receiving openings of different diameters and spaced angularly at oblique angles. A spanner type socket wrench in the shape of a nut has a clearance hole to fit over the wheel stud which projects from the nut and pins in its inner face so spaced to engage the openings in the nut. A conventional driver may be utilized for rotating the wrench to tighten or loosen the wheel nut. The device is intended for use as an anti-theft vehicle wheel lock. U.S. Pat. No. 4,269,248, which issued to B. MacLean et al on May 26, 1981, discloses a threaded nut including a body portion with a bearing surface at a workpiece engaging end defined by a flange. Segments of the bearing surface defined by the flange are flexible and resilient so that upon tightening of the fastener against the workpiece or other element, deflection of the resilient segment provides a spring action to compensate for developed looseness or loss of tension. Other segments of the bearing surface adjacent the flexible segments are rendered rigid by the body portion of the fastener and by brace structure associated with the body portion such that substantial spring forces are achieved. U.S. Pat. No. 4,302,137, which issued to H. Hart on Nov. 24, 1981, discloses a theft-resistant fastener for use as a vehicle wheel lock nut including a nut or bolthead and a spanner wrench component. The nut or bolthead possesses a smooth edge surface and the spanner component includes locating pins adapted to engage cooperating bores in the nut or bolthead to rotate the nut or bolthead with the spanner component. In addition to the above described nuts, the prior art also contemplates the use of externally threaded drill guide bushings for the purpose of drilling a reduced diameter aperture coaxially with a threaded bore in a component. For example, U.S. Pat. No. 2,917,331, which issued to J. Baer et al on Dec. 15, 1959, discloses an externally threaded guide bushing having a reduced diameter internal bore and a spoke driving surface to facilitate installation of the drill guide bushing in a threaded bore. After the drill guide bushing is installed, a conventional drill is utilized to drill the reduced diameter bore in a mating component and a cylindrical pin is inserted therethrough to rotationally fix the components against relative movement. U.S. Pat. No. 386 739 which issued to J. Connelly on Jul. 24, 1888, discloses another type of externally threaded drill guide bushing having a locking nut for securing the drill guide in an adjusted position.

While the above mentioned devices are directed to various types of nuts, spanner wrenches and drill guide bushings, none of these devices discloses a nut having spherically curved upper and lower surfaces in conjunction with a central threaded aperture surrounded by a plurality of radially outer, reduced diameter, threaded apertures. Additionally, none of the aforesaid prior art devices have been found to overcome problems associated with the use of fasteners on roadway surfaces, particularly those problems associated with a short surface life due to thermal and mechanical fatigue. Further, prior art fasteners utilized on roadway surfaces have been found to cause substantial damage to tires and vehicle suspensions and as such an improved nut is desired. Inasmuch as the art is relatively crowded with respect to these various types of nuts, it can be appreciated that there is a continuing need for and interest in improvements to such nuts, and in this respect, the present invention addresses this need and interest.

SUMMARY OF THE INVENTION

In view of the foregoing disadvantages inherent in the known types of nuts now present in the prior art, the present invention provides an improved nut for use on roadways, runways, in reinforced concrete construction, and the like. As such, the general purpose of the present invention, which will be described subsequently in greater detail, is to provide a new and improved nut which has all the advantages of the prior art nuts and none of the disadvantages.

To attain this, a representative embodiment of the concepts of the present invention is illustrated in the drawings and makes use of a nut for use on roadways, runways, in reinforced concrete construction, and the like, possessing a generally circular shape, with spherical top and bottom surfaces connected by a cylindrical side wall. A central aperture formed through the nut is threaded for engagement with an anchor bolt secured in a roadway surface by a conventional epoxy. Four smaller diameter threaded apertures are disposed on a common circle adjacent a peripheral edge of the nut, evenly spaced at ninety degree angular increments. The smaller diameter apertures are utilized in conjunction with a spanner wrench to tighten the nut on an anchor bolt. After the nut is tightened securely into position, an externally threaded drill guide bushing is engaged within each of the four smaller diameter apertures and utilized to drill a coaxial cylindrical bore in the roadway surface. After the drill guide bushings are removed, stepped diameter securing screws are tightened into each of the four smaller diameter apertures to prevent the nut from backing off after installation. The spherical top and bottom surfaces of the nut allow sufficient flexure to accommodate shock and expansion and contraction induced by temperature variations. The nut is designed for roadway applications such as the installation of expansion joints; the spherical upper surface of the nut reduces damage and shock to vehicle tires and vehicle occupants. The nut of the present invention may also be advantageously employed to secure arresting gear plates on runways utilized by military airplanes for carrier duty training. Further, the nut of the present invention may be employed to post-tension cables utilized in reinforced concrete construction, for example, in the construction of buildings.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the public generally, and especially those who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved nut for use on roadways, runways, in reinforced concrete construction, and the like, which has all the advantages of the prior art nuts and none of the disadvantages.

It is another object of the present invention to provide a new and improved nut for use on roadways, runways, in reinforced concrete construction, and the like, which may be easily and efficiently manufactured and marketed.

It is a further object of the present invention to provide a new and improved nut for use on roadways, runways, in reinforced concrete construction, and the like, which is of a durable and reliable construction.

An even further object of the present invention is to provide a new and improved nut for use on roadways, runways, in reinforced concrete construction, and the like, which is susceptible of a low cost of manufacture with regard to both materials and labor, and which accordingly is then susceptible of low prices of sale to the consuming public, thereby making such nut for use on roadways economically available to the buying public.

Still yet another object of the present invention is to provide a new and improved nut for use on roadways, runways, in reinforced concrete construction, and the like, which provides in the apparatuses and methods of the prior art some of the advantages thereof, while simultaneously overcoming some of the disadvantages normally associated therewith.

Still another object of the present invention is to provide a new and improved nut for use on roadways, runways, in reinforced concrete construction, and the like, which minimizes damage to vehicle tires and suspensions, and provides a smoother riding roadway surface.

Yet another object of the present invention is to provide a new and improved nut for use on roadways, runways, in reinforced concrete construction, and the like, adapted to tolerate metal fatigue caused by extreme temperature variation and thus provide a greatly increased service life.

Even still another object of the present invention is to provide a new and improved nut for use on roadways, runways, in reinforced concrete construction, and the like, which includes a plurality of threaded radially outer apertures for use in conjunction with a spanner wrench for tightening the nut and thereafter adapted to receive securing pins to prevent backing off of the installed nut.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
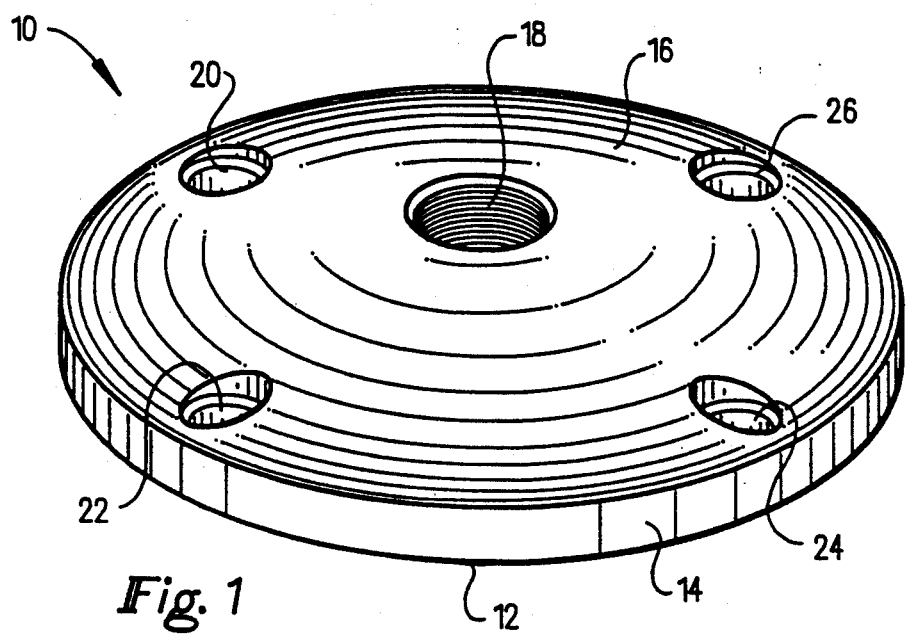
FIG. 1 is a perspective view of the nut for use on roadways, runways, in reinforced concrete construction, and the like, according to the present invention.
Figure 2:
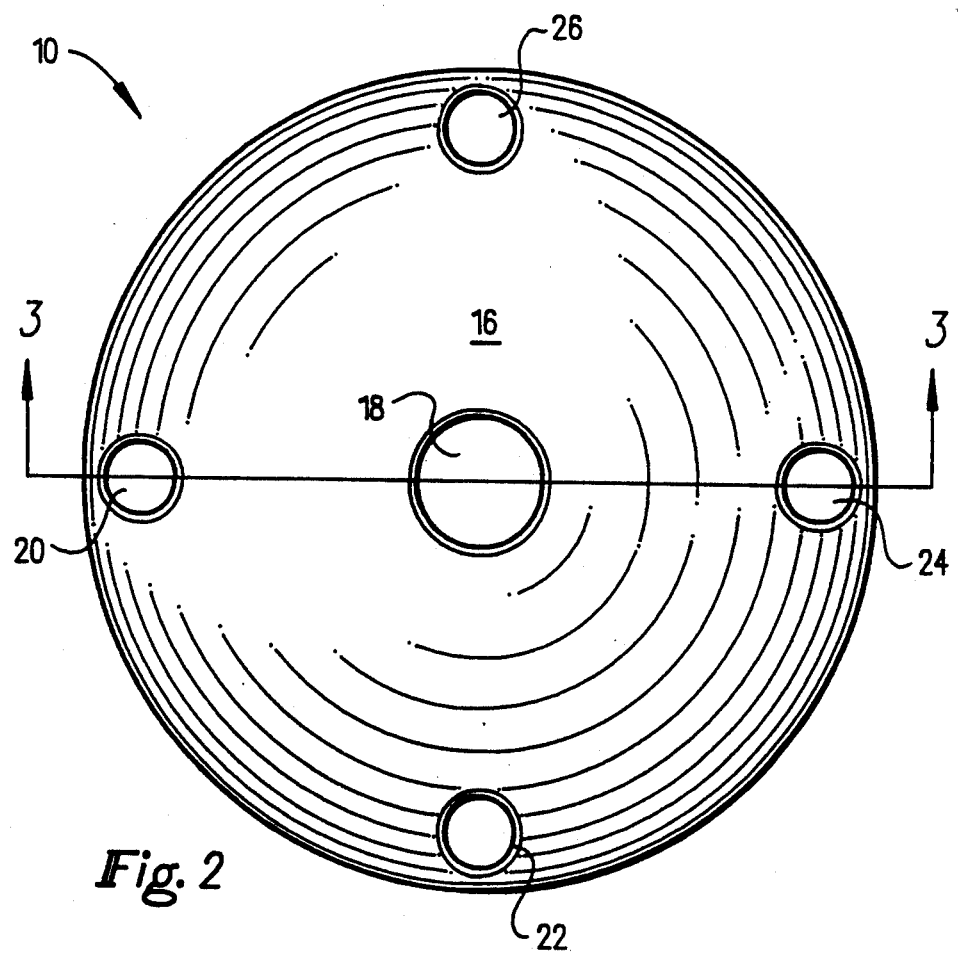
FIG. 2 is a top plan view of the nut for use on roadways, runways, in reinforced concrete construction, and the like, of the present invention.

With reference now to the drawings, and in particular to FIG. 1-6 thereof, a new and improved nut for use on roadways, runways, in reinforced concrete construction, and the like, embodying the principles and concepts of the present invention and generally designated by the reference numeral 10 will be described.

Figure 3:
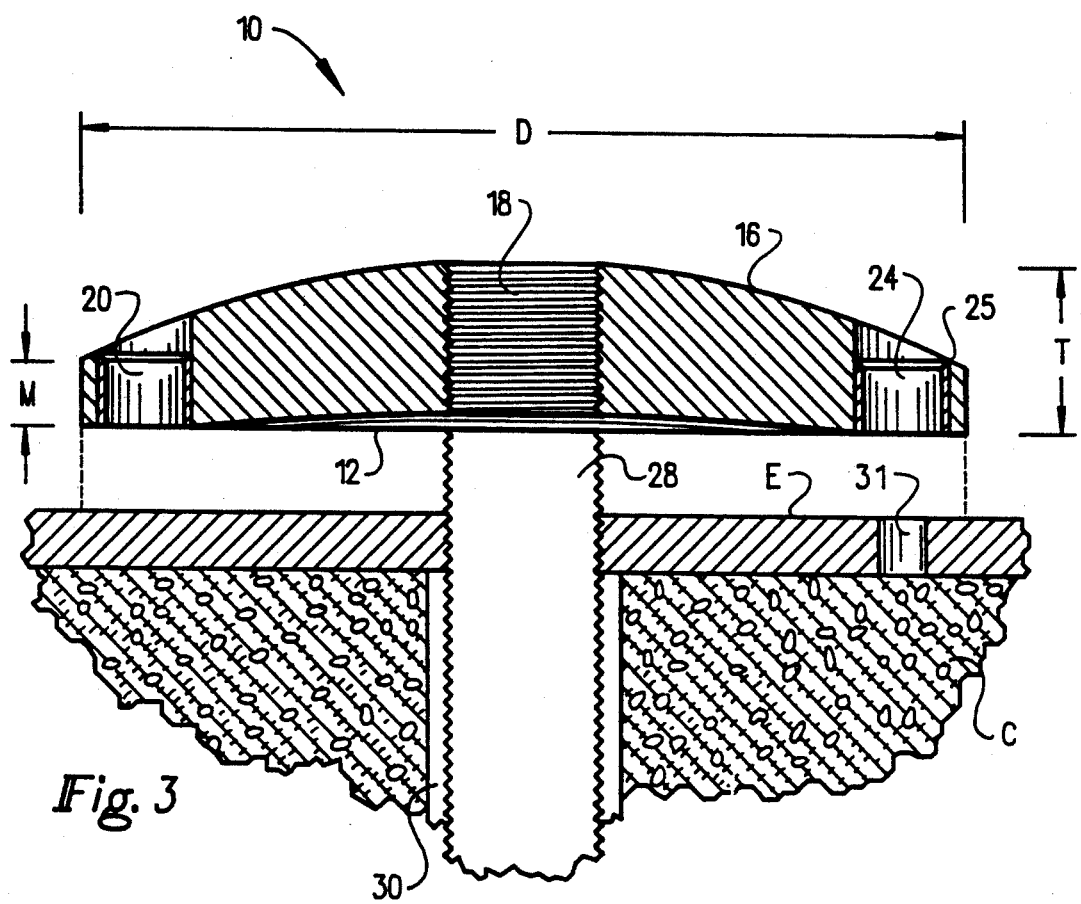
FIG. 3 is a transverse cross-sectional view, taken along line 3—3 of FIG. 2, and illustrating the manner of installing the nut of the present invention on a roadway.
Figure 4:
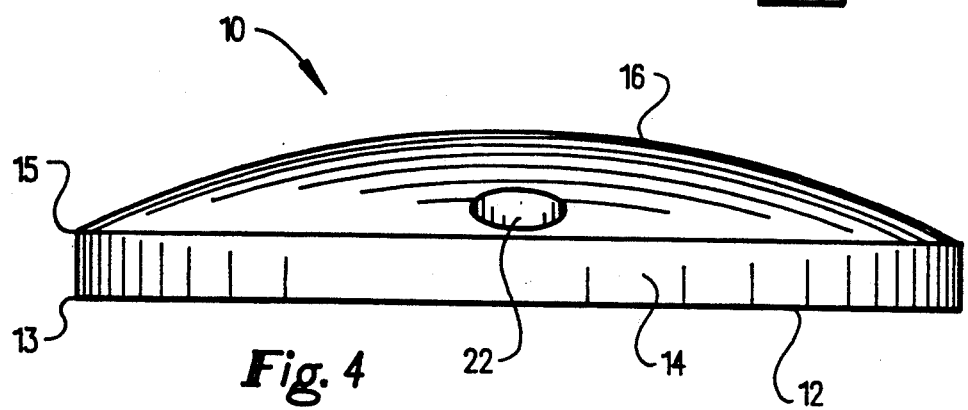
FIG. 4 is a side elevational view of the nut for use on roadways, runways, in reinforced concrete construction, and the like, according to the present invention.

More specifically, it will be noted that the first embodiment 10 of the invention includes a bottom surface 12 connected to an upper surface 16 by a cylindrical sidewall 14 having a diameter D (FIG. 3) of preferably 3.50 inches. As depicted in FIG. 4, the intersection 15 between the sidewall 14 and the upper surface 16 and the intersection 13 between the sidewall 14 and the bottom surface 12 are each chamfered, preferably 0.025+/−0.005 inches. As shown in FIG. 3, the bottom surface 12 and top surface 16 are each spherical in that each lies on the surface of a sphere. The spherical radius of curvature of the bottom surface 12 is preferably 13.00 inches, while the spherical radius of curvature of the top surface 16 is preferably 4.00 inches. As a result, the nut possesses a preferred maximum thickness of T of 0.650+/−0.005 inches and a preferred minimum thickness M of 0.250+/−0.005 inches. As may be appreciated from FIG. 2, a central aperture 18 formed centrally through the nut 10 is surrounded by four smaller apertures 20, 22, 24, 26 disposed at ninety degree angular increments. The aperture 18 is threaded, having preferred dimensions of ⅝ inches Dia.×11-2B, with a ⅛ pitch countersink at both ends. The apertures 20, 22, 24, 26 are each threaded and have preferred dimensions of ⅜ inches Dia.×16-2B. The radially outer portion of each of the apertures 20, 22, 24, 26, for example radially outer portion 25 of aperture 24, is countersunk ⅛ pitch at forty-five degrees from the edge. Each of the apertures 20, 22, 24, 26 are counterbored at 0.385 inches from the top surface 16 to the beginning of the threaded section at 25. The centerlines of the apertures 20, 22, 24, 26 are preferably disposed on a 3.00 Dia. circle.

Figure 3A:
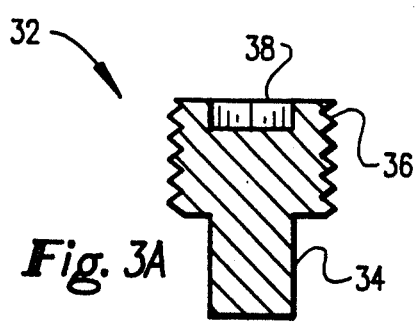
FIG. 3A is a longitudinal cross-sectional view illustrating a securing screw for use in installation of the nut for use on roadways, runways, in reinforced concrete construction, and the like, according to the present invention.
Figure 5:
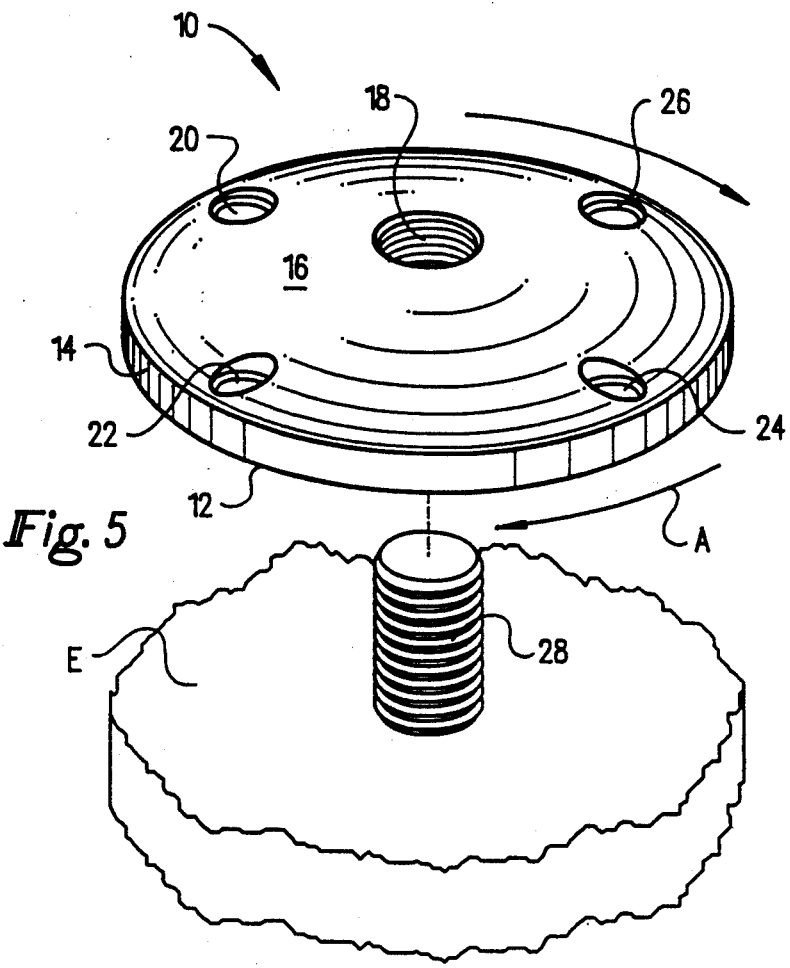
FIG. 5 is an exploded perspective view illustrating the manner of installing the nut for use on roadways according to the present invention.
Figure 6:
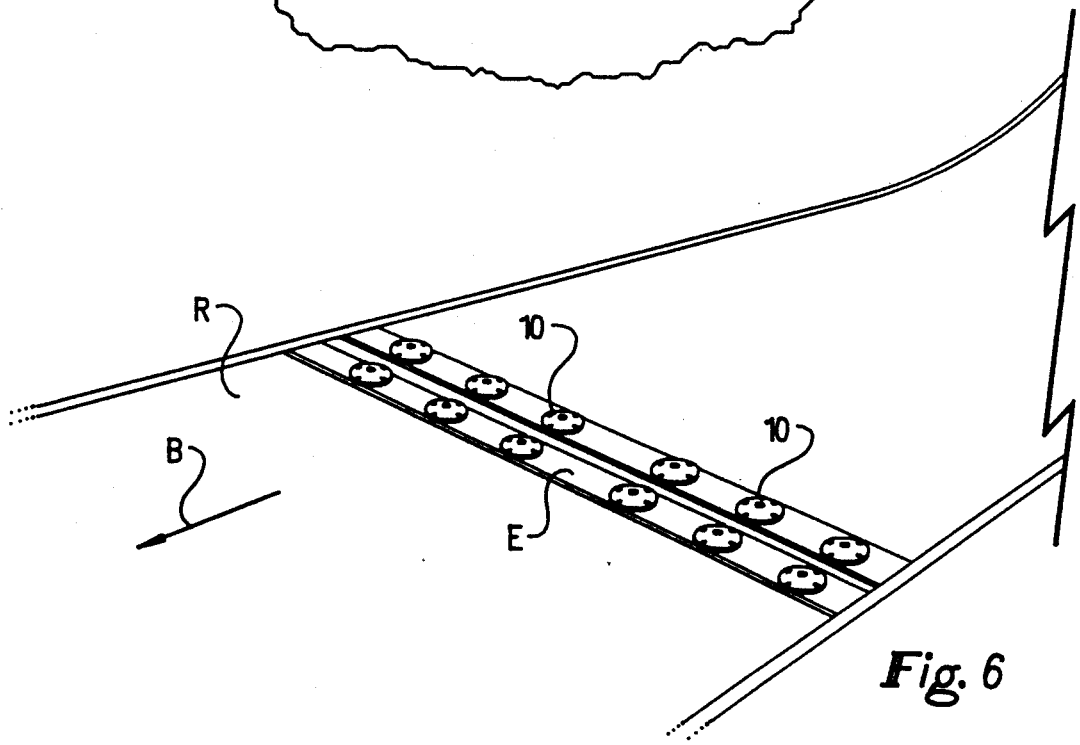
FIG. 6 is a perspective view illustrating a plurality of nuts according to the present invention securing an expansion joint on a roadway.

With reference to FIGS. 3, 3A, 5 and 6, the manner of installation of the nut 10 on a roadway will now be described. Anchor bolt 28 is first preferably embedded in a surface of a roadway R utilizing a conventional epoxy 30 surrounding bolt 28 within concrete C as shown in FIG. 3. One contemplated application of the nut 10 according to the present invention is to install an expansion joint E as shown in FIG. 6. In this context, the anchor bolt 28 will be installed through a metal component of an expansion strip E and into the road surface below, typically formed from concrete. The threaded central aperture 18 is then engaged with the exposed upper portion of the anchor bolt 28 as shown in FIG. 5. A spanner wrench, for example, of the type illustrated in U.S. Pat. No. 1,882,462, which issued to S. Weber on Oct. 11, 1932, the entire disclosure of which is incorporated herein by reference, is then engaged with two diametrically opposed apertures 20, 24 or 22, 26. The nut 10 is then rotated utilizing the spanner wrench in the direction of arrow A to tighten the nut 10 firmly against the surface E of the metal joint. As shown in FIG. 3, the circular bore 31 is then coaxially drilled in the surface of the metal joint E. It is to be understood that a cylindrical bore 31 will be drilled in coaxial alignment with each of the apertures 20, 22, 24 and 26. To assist in this operation, an externally threaded drill guide bushing may be employed, for example of the type illustrated in U.S. Pat. No. 2,917,331, which issued to J. S. Baer et al on Dec. 15, 1959, the entire the disclosure of which is hereby incorporated by reference. After four of the apertures 31 are drilled in coaxial alignment with each of the apertures 20, 22, 24 and 26, a securing screw 32 having a configuration shown in FIG. 3A is then installed in each of the apertures 20, 22, 24 and 26. The securing screws 32 each have a reduced diameter smooth wall cylindrical portion 34 dimensioned for engagement within the reduced diameter cylindrical bores 31 formed in the metal joint surface E. Additionally, each of the securing screws 32 include an upper, enlarged diameter portion 36 having external threads dimensioned for engagement with the internal threads formed in each of the apertures 20, 22, 24 and 26. To facilitate tightening of the securing screws 32, each may be provided with a recessed hex-socket 38 for engagement with a conventional wrench. In this manner, the traffic nut 10 is firmly secured against rotation and will not back off, even under heat stress and extreme vibration. To ensure that the set screws 32 will not back off, the socket 38 of each set screw 32 is preferably upset outwardly by striking the interior wall of the socket 38 with a punch inclined at about a 45 degree angle. If required, the set screws 32 can still be mechanically removed even after upsetting of the sockets 38.

The concavity and sphericity of the nut 10 enables applied torque to be maintained during extreme temperature variation that are encountered in highway applications. This enables the nut 10 to give or slightly flex, hence protecting the conventional epoxy bonding agent utilized to hold the anchor bolt 28 from being "ratcheted" by thermal differentials, as is encountered in a conventional flat nut. Temperatures of one hundred and forty degrees fahrenheit are common on the bridges in the Florida Keys during the summer months. At night, temperatures fall into the seventies. Similar temperature extremes are encountered in northern climates as well. As a result, over the course of the year, highways frequently see temperature variations of one hundred and fifty to two hundred degrees fahrenheit. The nut 10 of the present invention provides sufficient flexure to protect the embedded anchor bolt from mechanical fatigue due to repeated daily temperature changes.

Additionally, the spherical upper surface 16 of the nut 10, in conjunction with the chamfered edge 15, protects vehicle tires from being cut, and also reduces shock loading, thus providing a smoother vehicle ride and minimizing damage to vehicle suspensions. The nut 10 is also advantageously employed in military applications such as the securement of arresting gear plates to carrier aircraft training runways, and also to post-tension cables in reinforced concrete construction, for example, in the construction of buildings.

The nut 10 may be formed from a wide variety of metal materials, one preferred material is 17-4PH stainless steel to provide maximum corrosion resistance, reusability and a long service life.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new and desired to be protected by Letters Patent of the United States is as follows:

1. A nut, comprising:
   a body possessing an upper convex substantially spherically curved surface and a lower concave substantially spherically curved surface;
   said upper surface having a radius of curvature substantially less than a radius of curvature of said lower surface;
   said upper and lower surfaces connected by a substantially cylindrical side wall;
   said body being substantially circular in plan view; and
   a substantially cylindrical threaded bore extending substantially centrally through said body.

2. The nut of claim 1, further comprising a threaded aperture disposed through said body radially outwardly of said bore.

3. The nut of claim 1, further comprising a plurality of threaded apertures disposed through said body radially outwardly of said bore and spaced at substantially uniformed angular increments.

4. The nut of claim 1, wherein said upper surface has a radius of curvature of about 4 inches.

5. The nut of claim 1, wherein said lower surface has a radius of curvature of about 13 inches.

6. The nut of claim 1, wherein said upper surface has a radius of curvature of bout 4 inches and said lower surface has a radius of curvature of about 13 inches.

7. The nut of claim 1, wherein said body is formed from a metal material.

8. A nut, comprising:
   a body possessing an upper convex substantially spherically curved surface and a lower substantially spherically curved surface;
   a substantially cylindrical side wall connecting said upper and lower substantially spherically curved surfaces; and
   a threaded bore extending through said body.

9. The nut of claim 8, wherein said threaded bore extends substantially centrally through said body.

10. The nut of claim 8, wherein said body is substantially circular in plan view.

11. The nut of claim 8, wherein said upper surface has a radius of curvature of about 4 inches.

12. The nut of claim 8, wherein said lower surface has a radius of curvature of about 13 inches.

13. The nut of claim 8, wherein said upper surface has a radius of curvature of about 4 inches and said lower surface has a radius of curvature of about 13 inches.

14. The nut of claim 8, further comprising a plurality of threaded apertures disposed radially outwardly of said threaded bore and spaced at substantially uniform angular increments.

15. A nut, comprising:
   a body possessing an upper convex substantially spherically curved surface and a lower substantially spherically curved surface;
   a threaded bore extending through said body; and
   at least one threaded aperture disposed radially outwardly of said threaded bore.

16. The nut of claim 15, wherein said upper surface has a radius of curvature substantially less than a radius of curvature of said lower surface.

17. The nut of claim 15, wherein said upper surface has a radius of curvature of about 4 inches.

18. The nut of claim 15, wherein said lower surface has a radius of curvature of about 13 inches.

19. The nut of claim 15, wherein said upper surface has a radius of curvature of about 4 inches and said lower surface has a radius of curvature of about 13 inches.

20. The nut of claim 15, further comprising a plurality of threaded apertures disposed radially outwardly of said threaded bore and spaced at substantially uniform angular increments.

* * * * *